Sept. 24, 1963 A. L. MILLER 3,104,498
PROTECTIVE AND DECORATIVE COATING FOR FLOWER POTS
Filed April 28, 1960
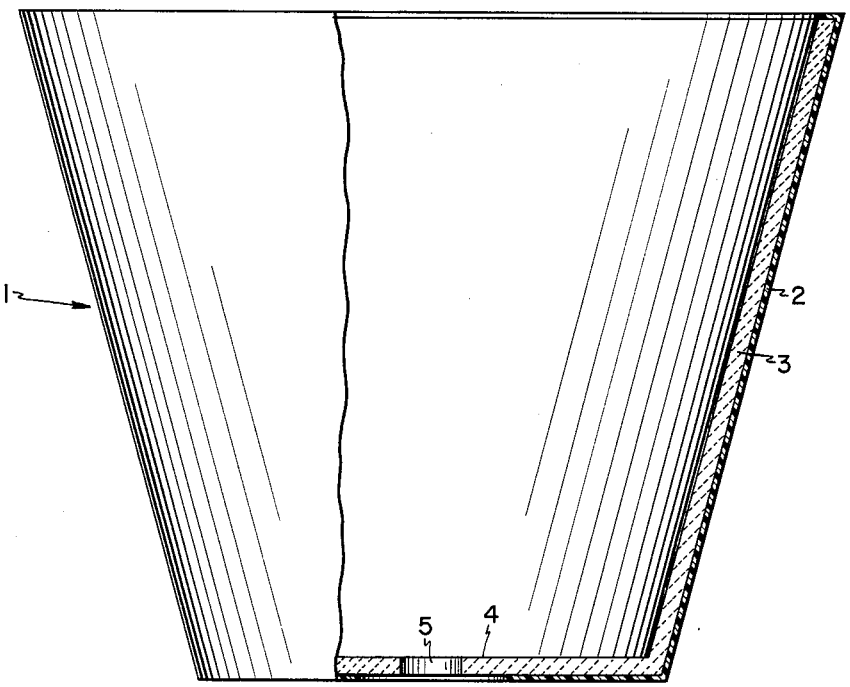
Alfred L. Miller
Inventor

United States Patent Office 3,104,498
Patented Sept. 24, 1963

3,104,498
PROTECTIVE AND DECORATIVE COATING FOR FLOWER POTS
Alfred L. Miller, 701 Willow Ave., Cranford, N.J.
Filed Apr. 28, 1960, Ser. No. 25,338
3 Claims. (Cl. 47—34)

The present invention relates to improved botanical containers. More particularly it concerns a covering for flower pots which, among other things, provides protection for the flower pot and its content from the damage that sometimes occurs during the shipping and the handling of such pots.

It is well known that porous pots are used as containers for flowers and other botanicals in order to supply air and moisture to the plant. These containers are in general quite fragile and require careful handling. It is, therefore, the main object of this invention to provide a covering for such containers which increases resistance to destructive insects and which does not interfere with the supply of air and moisture to the plant.

In carrying out the present invention a nonfibrous shrinkable coating, such as hydrated regenerated cellulose that may or may not be colored and/or decorated is placed on the outer surface of a flower pot and thereafter allowed to dry and consequently shrink until it firmly engages the outside wall and, if desired, all or part of the bottom and also the top lip or edge of the pot. The coating which is in the hydrated or gel form when it is placed over and about the flower pot, is usually in the shape of a band. While other shapes may be used, this particular design is preferred because it can be easily slipped over the flower pot and, when it is dried, there is no seam in the coating. The band or sleeve of the regenerated hydrated cellulose is flexible and somewhat elastic and can be used for more than one size and shape of pot. Thus it is not necessary to have a separate band size for every pot size and shape.

The accompanying drawing is a view, partly in section and partly in elevation, of a flower pot covered in accordance with the present invention.

Turning now to the accompanying drawing which shows a porous clay flower pot 1, covered with a thin film 2 of dry or substantially dry regenerated cellulose 20 mils thick that conforms closely to the shape of said pot. Pot 1 is a conventional botanical vessel having rigid sides 3, a bottom 4 and an open top. The form fitting film 2 is a single piece that covers the outer surface of sides 3, including the top of said sides, and part of the bottom 4 of said pot. The bottom 4 of pot 1 is perforated to form a passageway 5 which is uncovered to permit drainage of excess water from the contents of the pot.

The film usually contains a small amount of coloring materials such as dyes or pigments, e.g. 0.01 to 10 wt. percent, to make it attractive and cover the unsightly appearance of the flower pot. Sufficient pigmentation should be used to make the film opaque or non-transparent. Colors can be selected so that the pot blends well with the other colors in the environment. Designs can be printed on the band to enhance its attractiveness.

The novel flower pot coatings described herein may be obtained by cutting short sections, usually equivalent to or slightly longer than the height of the pot, from continuous lengths of tubes comprising regenerated cellulose. It is generally advisable, although it is not necessary, to add a softener to the cellulose prior to extruding it, to not only reduce cracking but also to assist in application of the coating to the pot by increasing its elasticity. The most commonly used softeners are glycerol, formamide, glycol and urea. The amount of these substances employed will of course depend on the degree of softness desired. Generally speaking, about 5 to 20 wt. percent of the selected softener based on the regenerated cellulose, will be used. A highly supple coating may contain at least 10% of glycerol, while a relatively non-elastic band will contain less than this amount.

The band of regenerated cellulose, which can also be in the form of a capsule that is closed at one end and opened at the other end, may vary in thickness from 1 to 50 mils and is usually 5 to 15 mils thick. It is conveniently applied to the flower pot by slipping it over the pot and in some instances, cutting or shaping the overlapping pieces, i.e. parts of the band that exceed the pot's height dimension, so that it covers the top edge or lip of the pot wall and/or the bottom of the pot. The hydrated film, when placed in the proper position, is dried either at ambient temperature or at temperatures up to 100° C., e.g. 15 to 50° C. While increasing the drying temperature shortens the shrinking time, it is generally best to employ temperatures no higher than about 60° C. As the coating dries it reduces in size until finally it conforms with the dimensions of the flower pot.

It is not intended to limit the invention to the above described embodiment but rather it is intended to claim all the novelty inherent in the invention as well as all the modifications and equivalents coming under the scope of this invention.

What is claimed is:

1. In combination, a flower pot made of a porous substance, said pot having an open top, a sidewall and a perforated bottom, a covering for the sidewalls of said container comprising a band of film, said band comprising substantially dehydrated, gas and water-vapor permeable, regenerated cellulose, said covering continuously engaging said sidewall and a part of the perforated bottom, whereby said perforation remains uncovered, said film additionally being loosely engaged with said sidewall and bottom when in the initially hydrated form and compressively engaged with said sidewall and bottom when in said substantially dehydrated form.

2. In combination, a clay flower pot having an open end, a sidewall and a bottom, said bottom having a single perforation, a covering comprising a seamless band of colored film, said film comprising substantially dehydrated, gas and water-vapor permeable, regenerated cellulose, and being about 1 to 50 mils thick, said covering continuously engaging an outer surface of said sidewall and the bottom of said pot, leaving said perforation uncovered, and additionally being loosely engaged with said sidewall and bottom when in the initially hydrated form and compressively engaged with said sidewall and bottom when in said substantially dehydrated form.

3. In combination, a flower pot made of a porous substance having an open top, a sidewall and a perforated bottom, and a thin seamless band of substantially dehydrated, gas and water-vapor permeable, regenerated cellulose, said band having a maximum thickness of 50 mils, said film continuously engaging an outer surface of said sidewall thereby imparting impact resistance strength to said pot, said band additionally being loosely engaged with said sidewall and bottom when in the initially hydrated form and compressively engaged with said sidewall and bottom when in said substantially dehydrated form.

References Cited in the file of this patent
UNITED STATES PATENTS

| | | |
|---|---|---|
| 1,685,392 | Beadle | Sept. 25, 1928 |
| 2,355,559 | Renner | Aug. 8, 1944 |
| 2,440,569 | Baldwin | Apr. 27, 1948 |
| 2,711,346 | Irwin et al. | June 21, 1955 |